US006670999B1

United States Patent
Fujino

(10) Patent No.: US 6,670,999 B1
(45) Date of Patent: Dec. 30, 2003

(54) CONTOUR EMPHASIZING CIRCUIT AND METHOD THEREOF

(75) Inventor: Shigeru Fujino, Tokyo (JP)

(73) Assignee: NEC Corporation, Tokyo (JP)

( * ) Notice: Subject to any disclaimer, the term of this patent is extended or adjusted under 35 U.S.C. 154(b) by 429 days.

(21) Appl. No.: 09/630,683

(22) Filed: Aug. 1, 2000

(30) Foreign Application Priority Data

Aug. 2, 1999 (JP) .......................................... 11-218901

(51) Int. Cl.[7] ................................................ H04N 5/21
(52) U.S. Cl. ....................... 348/625; 348/630; 348/252; 348/253; 382/266
(58) Field of Search ................................ 348/553, 630, 348/625, 627, 631, 501, 252, 253; 382/190, 266, 270

(56) References Cited

U.S. PATENT DOCUMENTS

| | | | | |
|---|---|---|---|---|
| 5,543,859 A | * | 8/1996 | Miyata et al. ............... | 348/625 |
| 5,668,606 A | * | 9/1997 | Okamoto et al. ............ | 348/625 |
| 6,320,625 B1 | * | 11/2001 | Suzuki et al. ............... | 348/625 |
| 6,359,659 B1 | * | 3/2002 | Suzuki et al. ............... | 348/625 |
| 6,404,460 B1 | * | 6/2002 | Chen et al. .................. | 348/606 |
| 6,433,836 B1 | * | 8/2002 | Suzuki et al. ............... | 348/625 |

FOREIGN PATENT DOCUMENTS

| JP | 4-294687 | 10/1992 |
|---|---|---|
| JP | 6-14214 | 1/1994 |
| JP | 408181888 A | * 7/1996 |

OTHER PUBLICATIONS

Japanese office action action with English translation of pertinent portions dated Jan. 7, 2003.

* cited by examiner

Primary Examiner—John Miller
Assistant Examiner—Jean W. Deésir
(74) Attorney, Agent, or Firm—Whitham, Curtis & Christofferson, PC

(57) ABSTRACT

A contour emphasizing circuit and a contour emphasizing method, in which an image having sharpness and a clear image can be obtained, are provided. The contour emphasizing circuit provides a contour emphasizing signal generating means which outputs a delayed video signal, a contour emphasizing signal, and a plurality of differential signals by processing an inputted video signal, a signal level difference detecting means to which the plurality of differential signals outputted from the contour emphasizing signal generating means are inputted and which outputs a signal selecting control signal, and a signal selecting means to which the delayed video signal, the contour emphasizing signal, and the signal selecting control signal are inputted and which mixes the delayed video signal with the contour emphasizing signal in an arbitrary ratio and outputs a video output signal or which selects the delayed video signal or the contour emphasizing signal and outputs the selected signal as a video output signal.

2 Claims, 4 Drawing Sheets

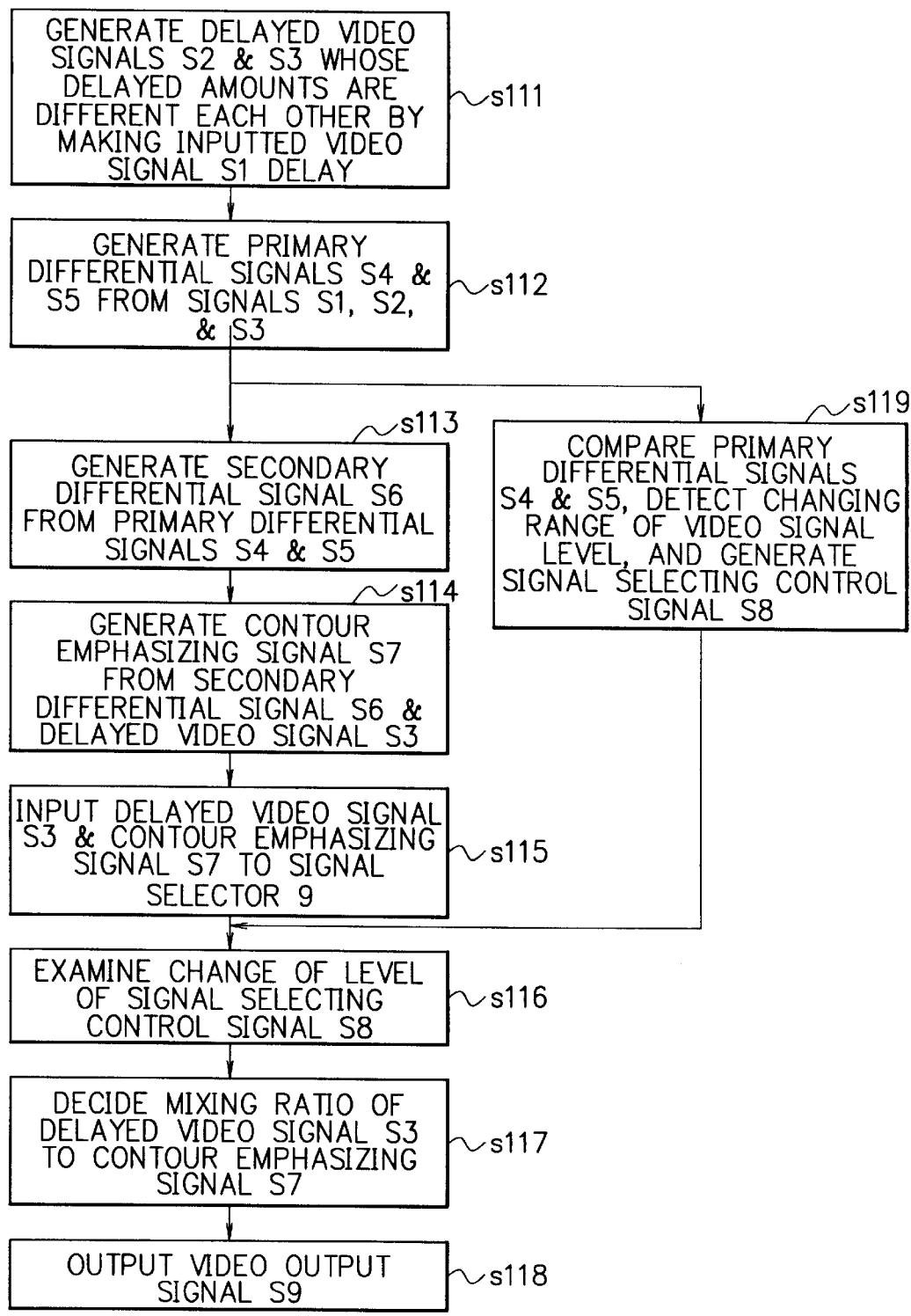

CONTOUR EMPHASIZING CIRCUIT AND METHOD THEREOF

BACKGROUND OF THE INVENTION

The present invention relates to a contour emphasizing circuit and a contour emphasizing method which are used in image processing.

DESCRIPTION OF THE RELATED ART

In a conventional contour emphasizing circuit used for image processing, a differential process is applied to an inputted signal and the resultant signal is added to the original inputted signal.

However, in the conventional contour emphasizing circuit, signals before and behind the contour part of an image are also amplified and emphasized. The emphasized region becomes wider than the contour part. Consequently, the image has reduced sharpness. Hence it is difficult to obtain a clear image with the conventional contour emphasizing circuit.

Further, the differential signal including noise or ringing is added to the original inputted signal, therefore, when the degree of the contour emphasizing is increased, there is a problem in that the signal to noise ratio (SNR) of a signal outputted from the contour emphasizing circuit is deteriorated.

SUMMARY OF THE INVENTION

It is therefore an object of the present invention to provide a contour emphasizing circuit and a contour emphasizing method in which an image having sharpness and a clear image can be obtained.

According to a first aspect of the present invention, for achieving the objects mentioned above, there is provided a contour emphasizing circuit. The contour emphasizing circuit provides a contour emphasizing signal generating means which outputs a delayed video signal, a contour emphasizing signal, and a plurality of differential signals by processing an inputted video signal, a signal level difference detecting means to which the plurality of differential signals outputted from the contour emphasizing signal generating means are inputted and which outputs a signal selecting control signal, and a signal selecting means to which the delayed video signal, the contour emphasizing signal, and the signal selecting control signal are inputted and which mixes the delayed video signal with the contour emphasizing signal in an arbitrary ratio and outputs a video output signal or which selects the delayed video signal or the contour emphasizing signal and outputs the selected signal as a video output signal.

According to a second aspect of the present invention, in the first aspect, the contour emphasizing signal generating means provides a plurality of delaying means which delays the inputted video signal and generates a plurality of delayed video signals in which one of the plurality of delayed video signals is a delayed video signal that the inputted video signal is delayed and the other of the plurality of delayed video signals is a delayed video signal that the delayed video signal is further delayed, a plurality of primary differential signal outputting means in which the inputted video signal and one of the plurality of delayed video signal are inputted and outputs a differential signal, and one and the other of the plurality of delayed video signals are inputted and outputs another differential signal, a secondary differential signal outputting means to which the differential signals outputted from the plurality of primary differential signal outputting means are inputted and outputs a secondary differential signal, and an adding means to which the further delayed video signal and the secondary differential signal are inputted and outputs the contour emphasizing signal.

According to a third aspect of the present invention, a contour emphasizing method provides the steps of; delaying an inputted video signal and outputting a delayed video signal, delaying the delayed video signal and outputting a further delayed video signal, applying primary differential to the inputted video signal and the delayed video signal and outputting a primary differential signal, applying primary differential to the delayed video signal and the further delayed video signal and outputting another primary differential signal, applying secondary differential to the primary differential signals and outputting a secondary differential signal, adding the further delayed video signal and the secondary differential signal and outputting a contour emphasizing signal, comparing the primary differential signals and detecting changing range of inputted video signal level and outputting a signal selecting control signal, and outputting a video signal by mixing the further delayed video signal with the contour emphasizing signal obtained at the adding process in an arbitrary ratio or by selecting the further delayed video signal or the contour emphasizing signal based on the signal selecting control signal.

BRIEF DESCRIPTION OF THE DRAWINGS

The objects and features of the present invention will become more apparent from the consideration of the following detailed description taken in conjunction with the accompanying drawings in which:

FIG. 4 is a flowchart showing operation of a second embodiment of the contour emphasizing circuit of the present invention.

DESCRIPTION OF THE PREFERRED EMBODIMENTS

Figure 1:
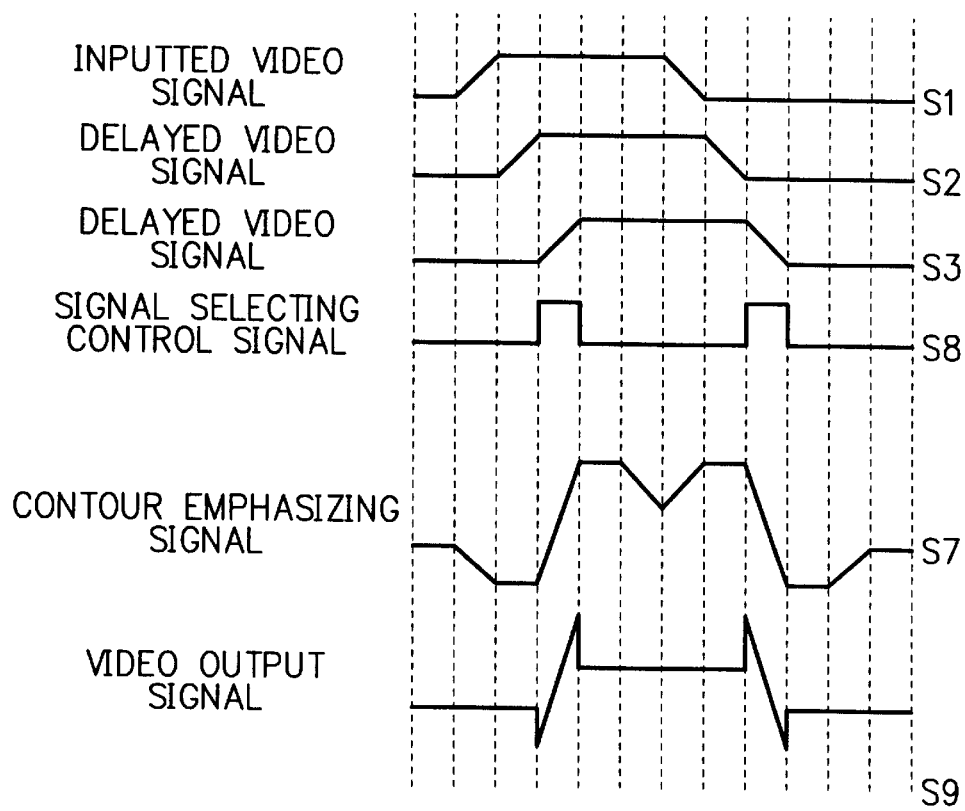
FIG. 1 is a diagram showing signals of a contour emphasizing circuit of the present invention.

Referring now to the drawings, embodiments of the present invention are explained in detail. In a contour emphasizing circuit of the present invention, a signal during a period when a signal level of a video signal is changing is replaced by a contour emphasized signal. With this, a high quality image with sharpness and without ringing and emphasizing unnecessary parts can be realized.

FIG. 1 is a diagram showing signals of a contour emphasizing circuit of the present invention. As shown in FIG. 1, at the contour emphasizing circuit, a signal selecting control signal S8 and a contour emphasizing signal S7 are generated by an inputted video signal S1, a delayed video signal S2, and a delayed video signal S3. And a video output signal S9 whose contour is emphasized can be obtained by that the signal selecting control signal S8 makes the delayed video signal S3 and the contour emphasizing signal S7 change over optimally.

Figure 2:
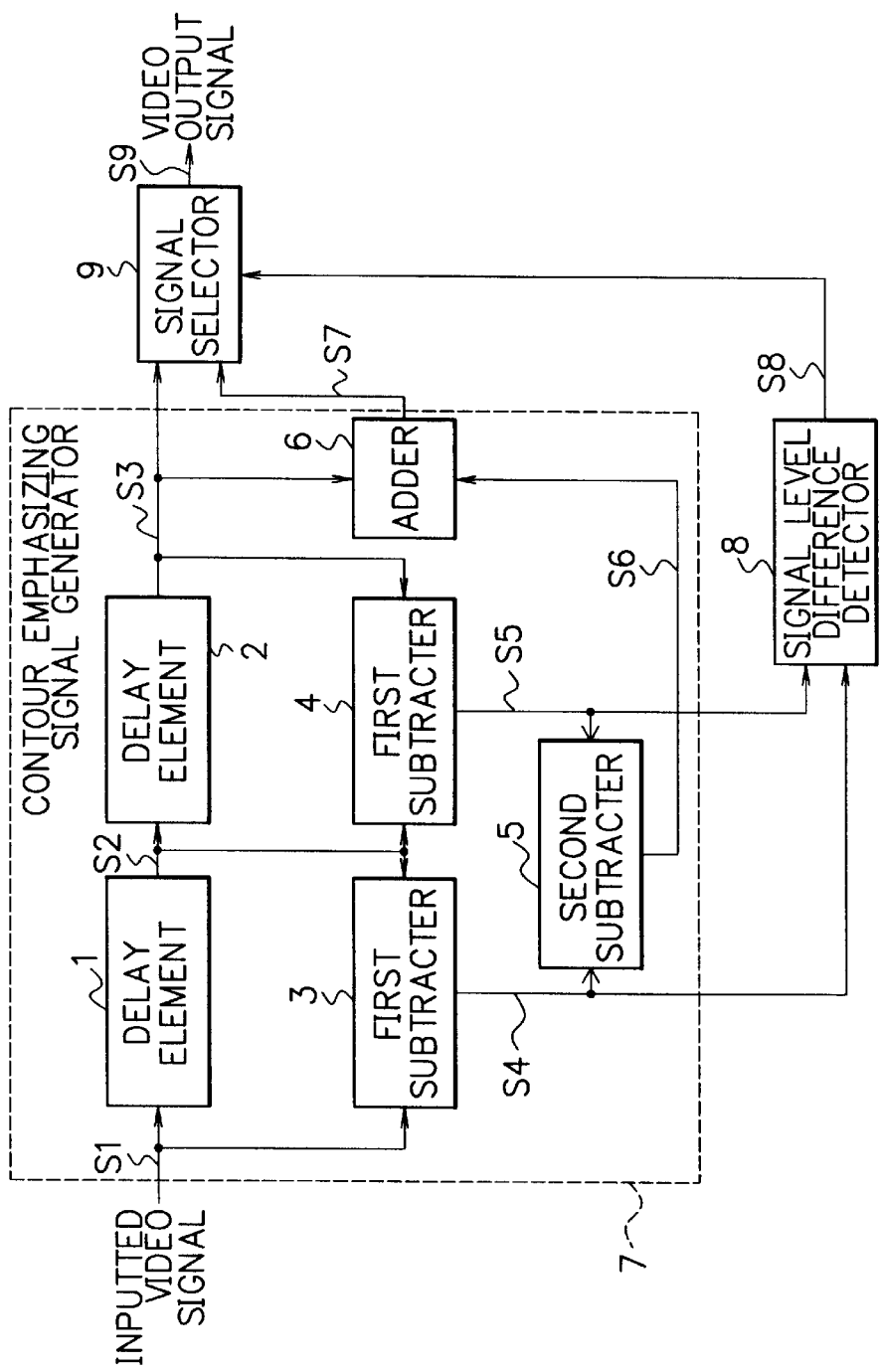
FIG. 2 is a block diagram showing a structure of an embodiment of the contour emphasizing circuit of the present invention.

FIG. 2 is a block diagram showing a structure of an embodiment of the contour emphasizing circuit of the present invention. As shown in FIG. 2, the embodiment of the contour emphasizing circuit of the present invention consists of a contour emphasizing signal generator 7, a signal level difference detector 8, and a signal selector 9. The contour emphasizing signal generator 7 consists of a delay element 1, a delay element 2, a first subtracter 3, a first subtracter 4, a second subtracter 5, and an adder 6.

Figure 3:
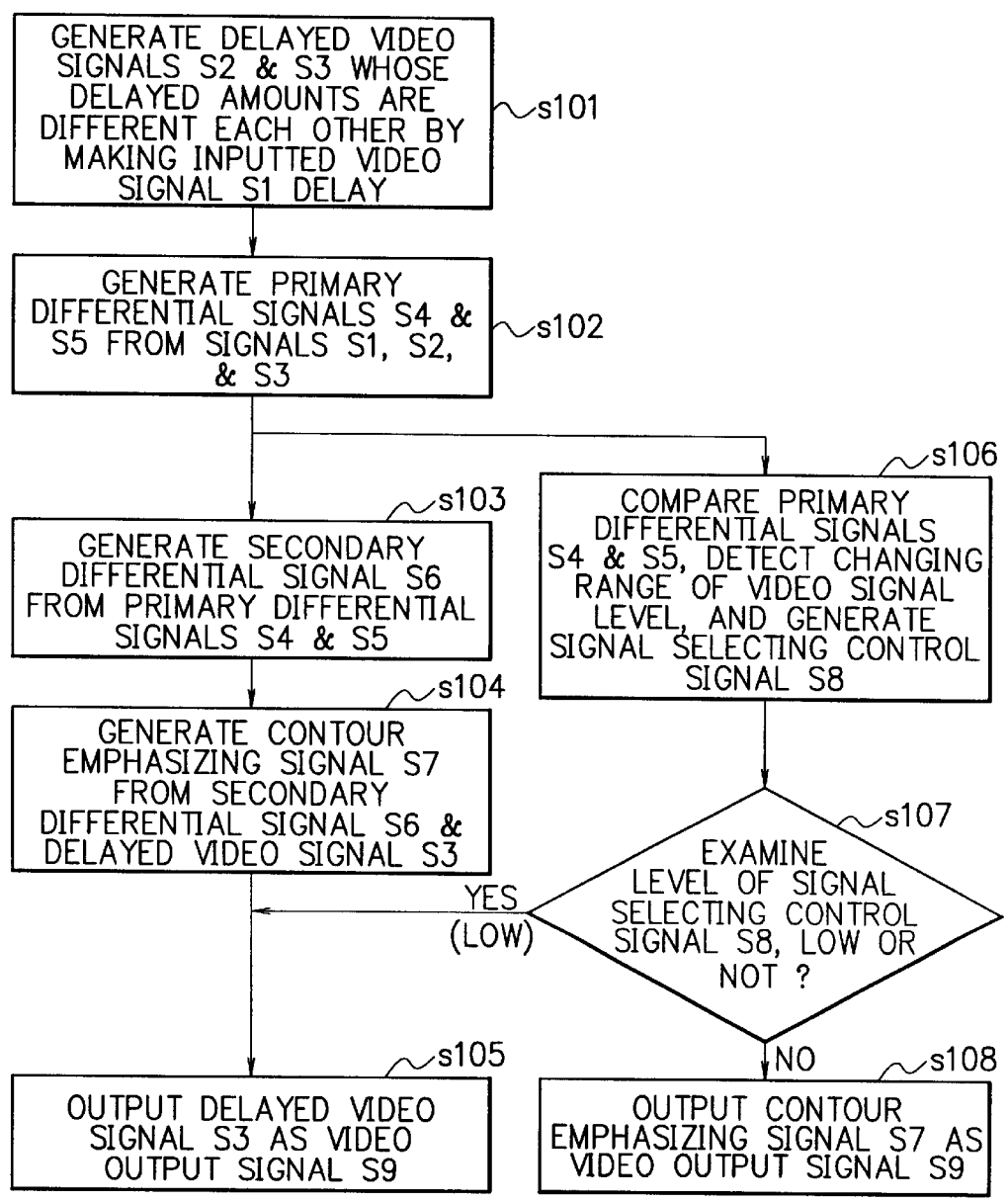
FIG. 3 is a flowchart showing operation of a first embodiment of the contour emphasizing circuit of the present invention.

FIG. 3 is a flowchart showing operation of a first embodiment of the contour emphasizing circuit of the present invention. Referring to FIGS. 1, 2, and 3, the operation of the first embodiment of the contour emphasizing circuit of the present invention is explained. First, an inputted video signal S1 is delayed at the delay elements 1 and 2, and delayed video signals S2 and S3 whose delayed amounts are different from each other are generated (step s101). The three video signals S1, S2, and S3 are inputted to a primary differential circuit composed of the first subtracters 3 and 4, and as shown in FIG. 2, a primary differential signal S4 is generated from the video signals S1 and S2 at the first subtracter 3, and a primary differential signal S5 is generated from the delayed video signals S2 and S3 at the first subtracter 4 (step s102).

The primary differential signals S4 and S5 generated respectively at the first subtracters 3 and 4 are inputted to the second subtracter 5, and a secondary differential signal S6 is generated (step s103). And this secondary differential signal S6 and the delayed video signal S3 are inputted to the adder 6, and a contour emphasizing signal S7 is generated (step s104). The operation mentioned above is performed at the contour emphasizing signal generator 7.

The primary differential signals S4 and S5 are inputted to the signal level difference detector 8 and compared, and the changing range of inputted video signal level is detected and the detected result is outputted as a signal selecting control signal S8 (step s106).

At the signal selector 9, the level of the signal selecting control signal S8 is examined (step s107), and either the contour emphasizing signal S7 or the delayed video signal S3 is selected in response to the change of the inputted video signal level. As shown in FIG. 1, when the signal selecting control signal S8 is low level, the delayed video signal S3 is selected as a video output signal S9 (step s105). And when the signal selecting control signal S8 is high level, the contour emphasizing signal S7 is selected as the video output signal S9 (step s108).

As mentioned above, the video output signal S9 can be obtained by selecting either the contour emphasizing signal S7 or the delayed video signal S3 which has the same delayed amount that the contour emphasizing signal S7 has, based on the signal selecting control signal 8 which shows the change of the inputted video signal level. That is, the contour emphasizing signal S7 is selected as the video output signal S9 in a period shortly after the inputted video signal S1 level is changing and the delayed video signal S3 is selected as the video output signal in at other times. At this video output signal S9, the period of the contour emphasizing signal S7 is short, therefore even when the degree of the emphasizing is increased, the ringing does not occur. Therefore, the SNR of the video output signal S9 is not deteriorated. The differential circuits composed of subtracters that are used at the present invention, can be replaced by other circuits having the same function.

Next, a second embodiment of the contour emphasizing circuit of the present invention is explained. The structure of the second embodiment is the same as the first embodiment shown in FIG. 2. In the first embodiment, the signal selector 9 generates the video output signal S9 being the contour emphasized signal by selecting either the contour emphasizing signal S7 or the delayed video signal S3, based on the signal selecting control signal 8 which responds to the change of the inputted video signal level. In the second embodiment, when the change of the level of the delayed video signal S3 is large, that is when the differential signal level of the inputted video S1 is large, a video output signal S9 is a mixed signal, in which the component of the contour emphasizing signal S7 is made to be large and the component of the delayed video signal S3 is made to be small. As mentioned above, in the second embodiment of the present invention, the video output signal S9, in which the mixing ratio of the contour emphasizing signal S7 to the delayed video signal S3 is changed in response to the differential signal level of the inputted video signal S1, can be outputted. With the second embodiment, the same effect as the first embodiment can be achieved. In the second embodiment, the primary differential signals S4 and S5, or the secondary differential signal S6 can be used as the differential signal which is used at the signal selector 9 to decide the mixing ratio. Or a combined signal, in which the primary differential signals S4 and S5 are combined with the secondary differential signal S6, can be used as the differential signal. Further, the nondifferential signals such as the inputted video signal S1, the delayed video signal S2, and the delayed video signal S3, can be combined with the primary differential signal S4 and S5 or the secondary differential signal S6, and used as the differential signal.

FIG. 4 is a flowchart showing operation of the second embodiment of the contour of the second embodiment of the contour emphasizing circuit of the present invention is explained. First, as in the first embodiment, an inputted video signal S1 is delayed at the delay elements 1 and 2, and delayed video signals S2 and S3 whose delayed amounts are different from each other are generated (step s111). These three video signals S1, S2, and S3 are inputted to a primary differential circuit composed of the first subtracters 3 and 4, and as shown in FIG. 2, a primary differential signal S4 is generated from the video signals S1 and S2 at the first subtracter 3, and a primary differential signal S5 is generated from the delayed video signals S2 and S3 at the first subtracter 4 (step s112).

The primary differential signals S4 and S5 generated respectively at the first subtracters 3 and 4 are inputted to the second subtracter 5, and a secondary differential signal S6 is generated (step s113). The secondary differential signal S6 and the delayed video signal S3 are inputted to the adder 6, and a contour emphasizing signal S7 is generated (step s114). The operation mentioned above is performed at the contour emphasizing signal generator 7 as in the first embodiment.

The primary differential signals S4 and S5 generated at the contour emphasizing signal generator 7 are inputted to the signal level difference detector 8 and compared, and the changing range of the inputted video signal level is detected and the detected result is outputted as a signal selecting control signal S8 (step s119).

The delayed video signal S3 and the contour emphasizing signal S7 are inputted to the signal selector 9 (step s115). And the change of the level of the signal selecting control signal S8 (the change of the inputted video signal level) is examined at the signal selector 9 (step s116).

The mixing ratio of the delayed video signal S3 to the contour emphasizing signal S7 is decided at the signal selector 9 (step s117). A video signal S3 with the contour emphasizing signal S7 at the signal selector 9 and outputted (step s118).

As mentioned above, in the second embodiment of the contour emphasizing circuit of the present invention, the mixing ratio of the contour emphasizing signal S7 to the delayed video signal S3 is changed in response to the difference between the inputted video signal level from the secondary differential signals S4 and S5. That is, the second embodiment has a function that judges the level of the differential signals.

According to the first embodiment of the present invention the contour emphasizing signal S7 is only used when the inputted video signal level is changing. Therefore, contour emphasizing with high definition can be achieved. And even with the degree of the contour emphasizing increased, ringing does not occur and the SNR is not deteriorated.

Further, in the second embodiment of the present invention, the contour emphasizing circuit of the present invention can adjust the mixing ratio of the delayed video signal S3 to the contour emphasizing signal S7 in response to the inputted video signal level. Therefore, the contour emphasizing with high definition can be achieved. And even with the degree of the contour emphasizing increased, ringing does not occur and the SNR is not deteriorated.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A contour emphasizing circuit, comprising:
    a contour emphasizing signal generating means which outputs a delayed video signal, a contour emphasizing signal, and a plurality of differential signals by processing an inputted video signal, wherein the plurality of differential signals are produced by subtraction of delayed video signals having different amounts of delay, said contour emphasizing signal generating means comprising
        a plurality of delaying means which delays said inputted video signal and generates a plurality of delayed video signals wherein the plurality of delayed video signals each have different amounts of delay, and one delayed video signal is further delayed than another video signal,
        a plurality of primary differential signal outputting means in which said inputted video signal and one of said plurality of delayed video signals are inputted and outputs a differential signal, and one of the other of said plurality of delayed video signals are inputted and outputs another differential signal,
        a secondary differential signal outputting means to which said differential signals outputted from said plurality of primary differential signals outputting means are inputted, and outputs a secondary differential signal, and
        an adding means to which said further delayed video signal and said secondary differential signal are inputted and outputs said contour emphasizing signal;
    a signal level difference detecting means to which said plurality of differential signals outputted from said contour emphasizing signal generating means are inputted and which outputs a signal selecting control signal; and
    a signal selecting means to which said delayed video signal, said contour emphasizing signal, and said signal selecting control signal are inputted and which mixes said delayed video signal with said contour emphasizing signal in an arbitrary ratio and outputs a video output signal or which selects said delayed video signal or said contour emphasizing signal and outputs said selected signal as a video output signal.

2. A contour emphasizing method, comprising the steps of:
    delaying an inputted video signal and outputting a delayed video signal;
    delaying said delayed video signal and outputting a further delayed video signal;
    applying primary differential to said inputted video signal and said delayed video signal and outputting a primary differential signal;
    applying primary differential to said delayed video signal and said further delayed video signal and outputting another primary differential signal;
    applying secondary differential to said primary differential signals and outputting a secondary differential signal;
    adding said further delayed video signal and said secondary differential signal and outputting a contour emphasizing signal;
    comparing said primary differential signals and detecting changing range of inputted video signal level and outputting a signal selecting control signal; and
    outputting a video signal by mixing said further delayed video signal with said contour emphasizing signal obtained at said adding process in an arbitrary ratio or by selecting said further delayed video signal or said contour emphasizing signal based on said signal selecting control signal.

* * * * *

UNITED STATES PATENT AND TRADEMARK OFFICE
CERTIFICATE OF CORRECTION

PATENT NO. : 6,670,999 B1
DATED : December 30, 2003
INVENTOR(S) : S. Fujino

It is certified that error appears in the above-identified patent and that said Letters Patent is hereby corrected as shown below:

<u>Title page,</u>
Item [73], Assignee, should read -- NEC Viewtechnology, Ltd. Tokyo (JP) --

Signed and Sealed this

Twenty-eighth Day of September, 2004

JON W. DUDAS
*Director of the United States Patent and Trademark Office*